Figure 1:
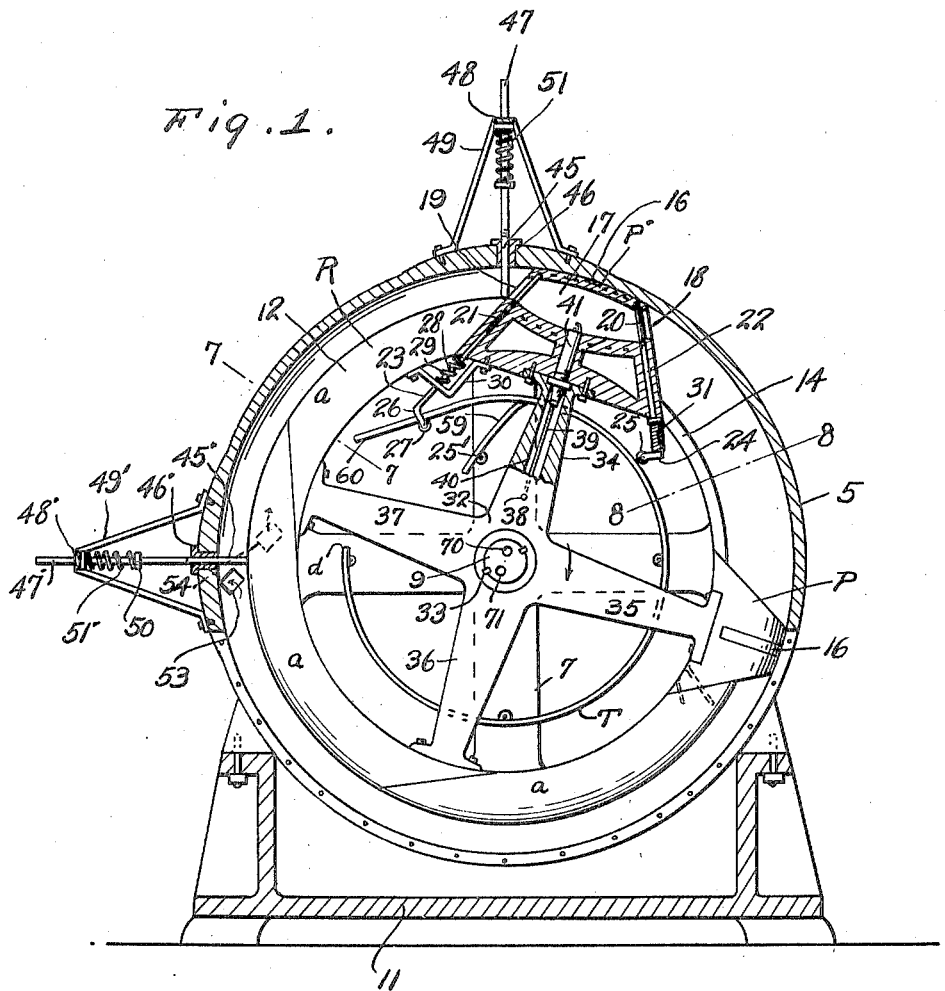

July 23, 1929.  N. F. HANSON  1,721,624
INTERNAL COMBUSTION ENGINE
Filed April 17, 1928  5 Sheets-Sheet 1

Inventor
*Niels F. Hanson*

By *Clarence A. O'Brien*
Attorney

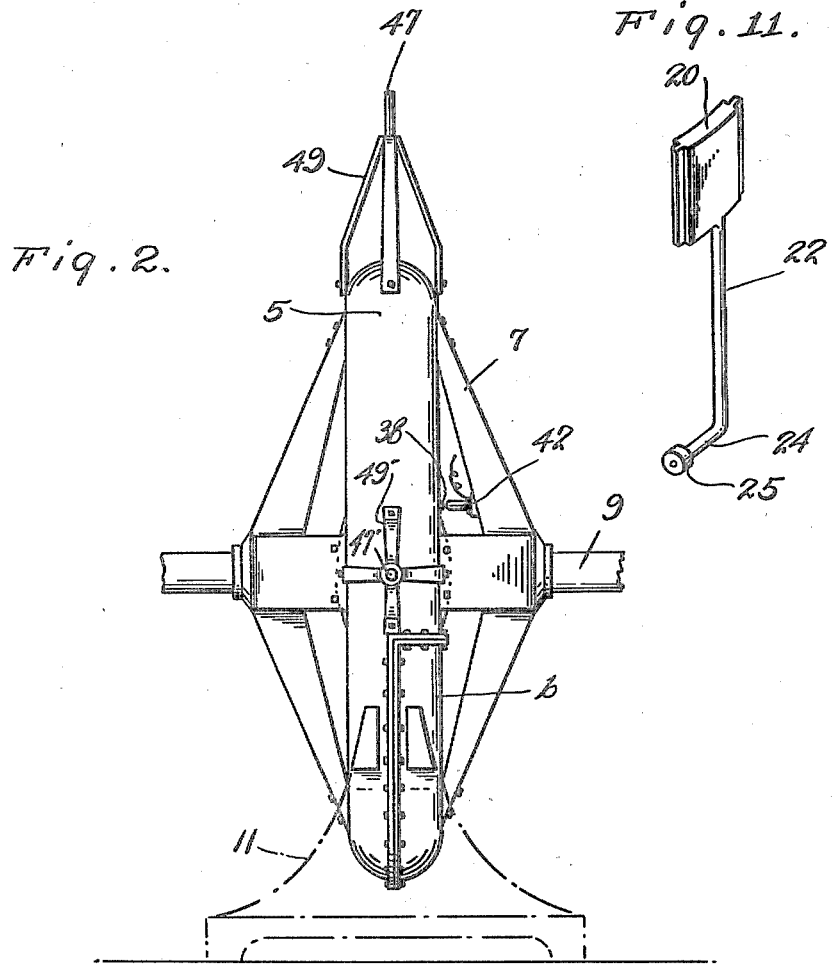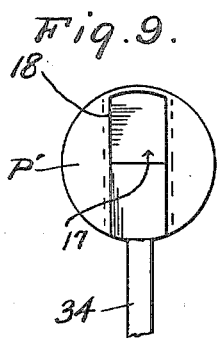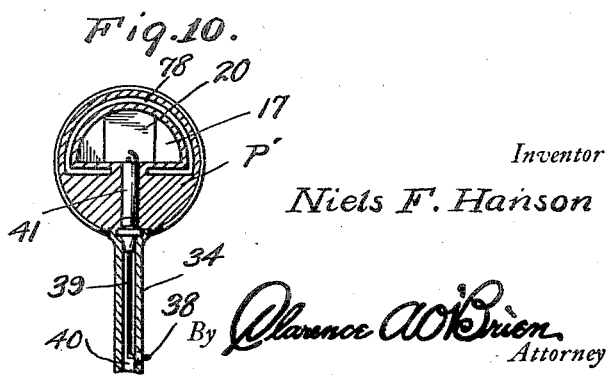

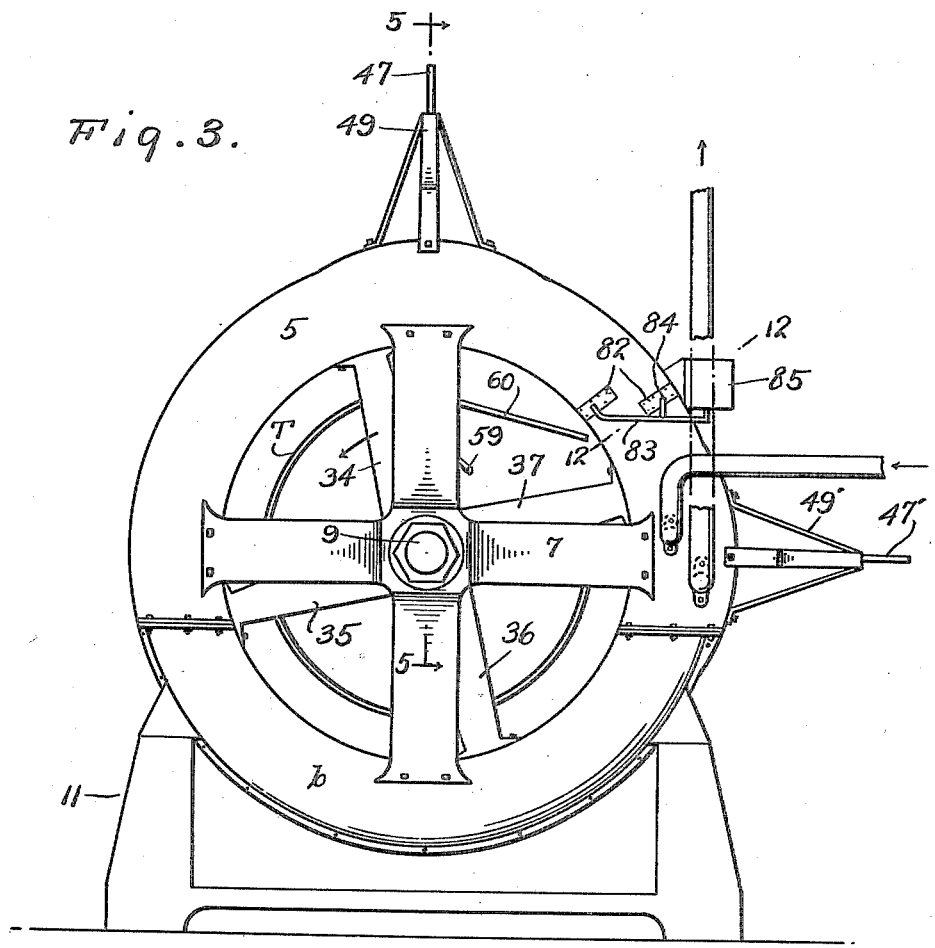
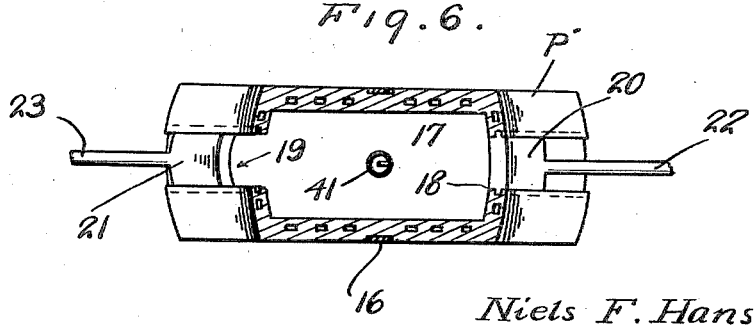

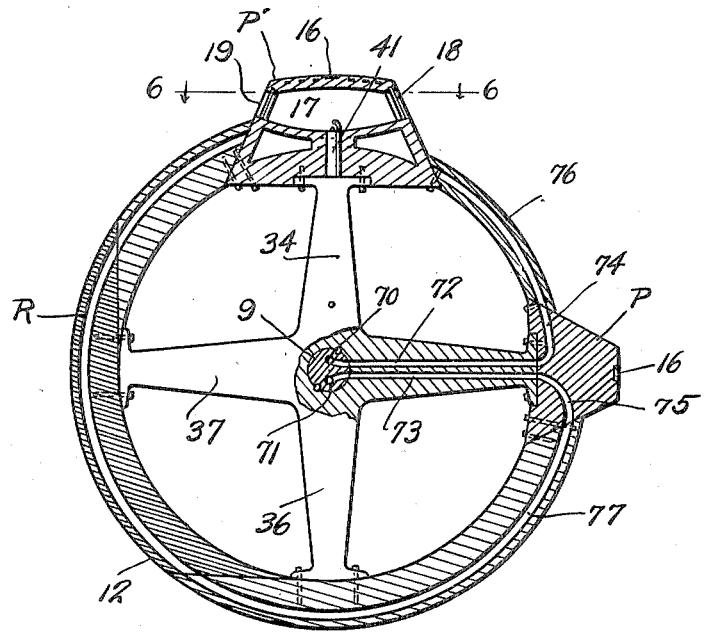
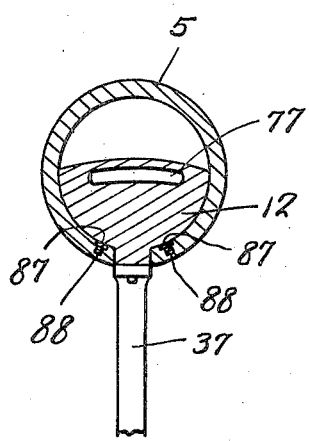
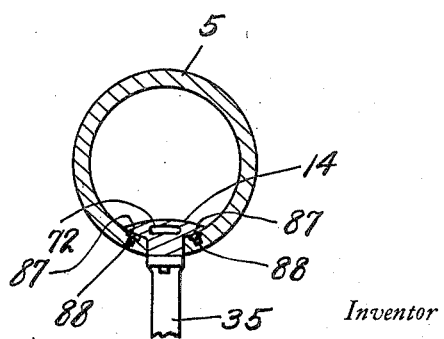

July 23, 1929.  N. F. HANSON  1,721,624
INTERNAL COMBUSTION ENGINE
Filed April 17, 1928    5 Sheets-Sheet 5
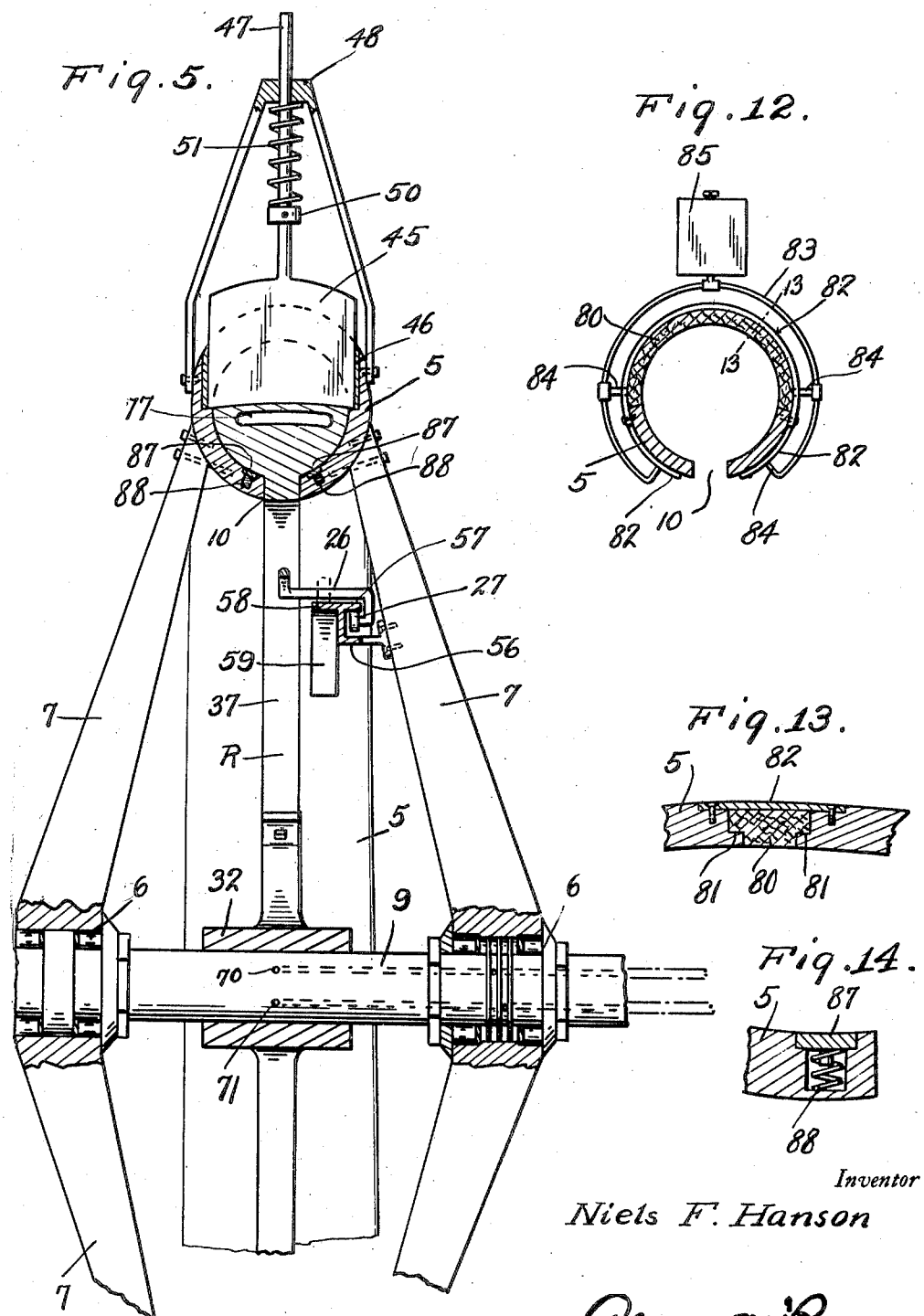
Inventor
*Niels F. Hanson*
By *Clarence A. O'Brien*
Attorney

Patented July 23, 1929.

1,721,624

UNITED STATES PATENT OFFICE.

NIELS F. HANSON, OF GUNNISON, UTAH, ASSIGNOR TO ROYAL HANSEN, OF STERLING, UTAH.

INTERNAL-COMBUSTION ENGINE.

Application filed April 17, 1928. Serial No. 270,745.

The present invention relates to an internal combustion engine of the rotary type in which the cylinder is made in circular formation and a rotor operates therein.

Some of the important objects of the invention are to harness more of the power of the gasoline used as fuel, to provide a relatively more powerful engine with a lighter weight, to minimize vibration, to avoid loss of power in the stopping and starting of pistons as in the ordinary reciprocating internal combustion engine, to shorten the intake stroke of the piston without loss of sufficient combustible gas mixture for efficient compression and power stroke, to lengthen the power stroke thereby utilizing more of the power of the fuel to eliminate numerous moving parts such as wrist pins, connecting rod bearings and the usual main bearings found in the ordinary reciprocating type of engine, to reduce carbon deposits in the engine to minimize friction.

A still further very important object of the invention resides in the provision of a rotary internal combustion engine of this type which is comparatvely simple in its construction, has its parts arranged in a compact and convenient manner, is strong and durable, economical, and thoroughly efficient and reliable in operation.

With the above and numerous other objects in view as will appear as the description proceeds, the invention resides in certain novel features of construction, and in the combination and arrangement of parts as will be hereinafter more fully described and claimed.

In the drawing:

Figure 1 is an end elevation of the engine embodying the features of this invention showing portions in vertical transverse section, Figure 2 is a side elevation of the engine, Figure 3 is an end elevation thereof looking in an opposite direction from that shown in Figure 1, Figure 4 is a vertical transverse section through the rotor, Figure 5 is a vertical longitudinal section taken substantially on the line 5—5 of Figure 3, Figure 6 is a detail section taken through the piston having the firing chamber substantially on the line 6—6 of Figure 4, Figure 7 is a detail section taken substantially on the line 7—7 of Figure 1, Figure 8 is a similar section taken substantially on the line 8—8 of Figure 1, Figure 9 is an end elevation of the piston having the firing chamber, Figure 10 is a sectional view therethrough taken at right angles to that shown in Figure 6, Figure 11 is a perspective view of one of the valves associated with the piston having the combustion chamber, Figure 12 is a detail section taken substantially on the line 12—12 of Figure 3 for illustrating the lubricating means, Figure 13 is a detail section taken substantially on the line 13—13 of Figure 12, and Figure 14 is a detail fragmentary section showing the spring pressed packing ring.

Referring to the drawing in detail it will be seen that the numeral 5 denotes a cylinder which is of circular formation concentrically disposed about a shaft 9. This cylinder 5 is formed with a slot of continuous formation in the innermost portion of its wall as is indicated at 10. The shaft 9 is rotatable in a pair of bearings 6, from which radiate outwardly arms 7 inclining inwardly toward each other and having their outer ends attached to the side portions of the circular cylinder 5. These arms 7 form the framework of the engine which may be mounted on a base structure 11 of suitable or preferred formation.

A rotor is indicated generally by the letter R which comprises a relatively long section 12 of relatively large cross sectional area and a section 14 of relatively short and relatively small cross sectional area having disposed between one set of adjacent ends a solid piston P and a hollow piston P'. The relatively long and relatively large cross sectional area section 12 may be formed in a plurality of segments $a$ if so desired as is indicated in Figure 1. The cylinder 5 is provided with a detachable wall section $b$ so that the parts of the rotor R may be assembled and disassembled in the cylinder. The piston P is solid and has packing 16 thereon for bearing against the inner surface of the cylinder 5. The piston P' is formed with a combustion chamber 17 having an inlet port 18 and an outlet port 19 at the front and rear ends thereof, said ends being beveled so as to incline inwardly and outwardly from each other. In the ends of the piston P' there are slidable valves 20 and 21 for closing respectively ports 18 and 19. These valves 20 and 21 have extending therefrom respectively stems 22 and 23 which terminate inwardly of the cylinder. The stem 22 has a lateral extension 24 with a roller 25 journaled in the extremity thereof. The stem 23 has a lateral extension 26 with a roller 27 journaled on the end thereof. The stem 23 is formed with a shoulder 28 and a spring 29 is disposed about the stem 23 impinging against the shoulder 28 and a bracket 30 carried by the rotor and through which a portion of the stem 23 is slidable so that the spring 29 normally holds the valve 21 closed across the port 19. A spring 31 is disposed about the valve stem 22 and impinges against the piston P' and the extension 24 to normally hold the valve 20 open as to the port 18. A hub 32 is secured to the shaft 9 for rotation therewith in any preferred manner such as keys 33 and has spokes 34, 35, 36 and 37 radiating outwardly therefrom with their outer ends secured to the rotor. The spoke 34 is secured to the piston P', the spoke 35 being secured to the piston P and spokes 36 and 37 are secured to section 12 of the rotor. These spokes are preferably ninety degrees apart. A contact 38 is mounted on the spoke 34 and is electrically connected with a conductor 39 extending through a bore 40 provided in the spoke 34. This conductor 39 is connected with a spark plug 41 threadily engaged in the piston P' to terminate in the combustion chamber 17 thereof. The contact 38 at one point in its path of movement about the axis of the engine is adapted to engage with another contact 42 on one of the arms 7 which is connected with a source of high tension voltage so that when the two contacts are engaged ignition takes place in the firing chamber 17 by spark jumping the points of the spark plugs 41 in the usual well known manner. An abutment 45 is slidable through a bearing structure 46 of suitable formation in the outer wall portion of the cylinder 5 to bear against the rotor R as is more clearly illustrated in Figure 5. This abutment 45 has a stem 47 extending outwardly therefrom and slidable through a guide 48 which is supported by legs 49 extending inwardly therefrom and attached to the cylinder 5. A collar or shoulder 50 is provided on the stem 47 and a spring 51 is disposed about the stem 47 impinging against the guide 48 and the collar 50 to urge the abutment 45 inwardly. An abutment 45' is slidable through a suitable bearing structure 46' in the cylinder 5, said bearing structures 46 and 46' being spaced, in the present example of the invention, approximately ninety degrees apart. A stem 47' extends outwardly from the abutment 45' through a guide 48' mounted by means of legs 49' attached to the cylinders. A spring 51' about the stem 47' impinges against a collar 50' on the stem and guide 48' to urge the abutment 45' inwardly.

The cylinder 5 is formed with an exhaust port 53 and an intake port 54 which are slightly circumferentially spaced and also radially spaced, the port 54 being closer to the axis of the shaft 9 than the port 53. The ports 53 and 54 are disposed one to each side of the abutment 45' as is illustrated in Figure 1. A track T has the major portion of its length disposed concentrically about the shaft 9 being supported in place by a suitable bracket 56 on spokes 7. This track T comprises rail sections 57 and 58. The rail section 58 has an end extension 59 curved inwardly while the rail section 57 has an end extension 60 curved outwardly, these extensions being at the same end of the track T. The roller 27 operates on the inner surface of the rail section 57 and the roller 25' operates on the exterior surface of the rail section 58.

The rotor moves in the direction of the arrows shown in Figures 1 and 3 and will be referred to particularly in describing the apparatus. The rotor moves in a clockwise direction so that pistons P and P' which have the beveled ends will engage the abutments 45' and 45 in the order mentioned. Starting with the parts as disclosed in Figure 1, the combustion chamber 17 of the piston P' contains a supply of combustible gas and the valve 21 is open and the valve 20 closed. The ignition takes place as soon as contacts 38 and 42 come together thus exploding the combustible gas and driving the piston P' in a clockwise direction. The piston P engages and opens the abutment 45' and passes thereby, the abutment closing in behind piston P. The piston P as it further travels sets up a suction through the port 54. The piston P' next actuates the abutment 45' at which time the piston P is actuating the abutment 45. After the piston P' passes by the abutment 45' the rollers 25 and 27 slip off the end d of the track T so that spring 29 still maintains the valve 19 closed and spring 31 opens valve 20. As the piston P moves a little further on roller 25 engages e 59 and roller 27 engages end 60 to cause the closing of valve 20 and the opening of the valve 21 as piston P' approaches the abutment 45. As a matter of fact valve 20 is actuated first in an open position to admit through the port 18 the gases sucked in by piston P and compressed between piston P' and the abutment 45. The valve 21 practically remains closed until the piston P' just about passes the abutment 45 as disclosed in Figure 1 and then this valve 21 is open. It will be seen that section 12 of the rotor R closes the port 54 but the section 14 opens this port because of the differences in cross sectional area and therefore the piston P will suck gas through the opening 54 but piston P' will not. Piston P moves in front of the burnt gases and forces them out through the exhaust opening 53.

Any suitable cooling system may be adapted to the engine. For example the shaft 9 may be provided with longitudinally extending passages 70 and 71 in circuit with a pump and a radiator of conventional construction. One of the spokes namely 35 is provided with passages 72 and 73 extending respectively from passes 70 and 71 to respectively passages 74 and 75 in the piston P. These passages 74 and 75 communicate with passages 76 and 77 respectively, the former being in section 14 and the latter in section 12 and lead to a passage 78 in the piston P'. Thus water may be circulated through the parts having such passages for cooling purposes as will be quite obvious.

Any suitable lubricating means may be used and by way of example I have disclosed absorbent members 80 in the cylinder 5 between the abutments 45 and 45'. These absorbent members 80 are held in place in any suitable manner such as by shoulders 81 and plates 82. The absorbent members are disposed in staggered relationship as is indicated in Figure 3 to prevent the weakening of the cylinder. Obviously the pistons and the rotor sections will wipe against these absorbent members and deliver lubricant thereto. The lubricant is delivered to the absorbent members by means of pipes 83 provided with branches 84 leading through the plates 82 and the pipe 83 leads from an oil container 85. It is preferable to have the oil of a gravity feed type although a force feed may be used if desired. In order to prevent the escape of gas and oil I provide packing bands 87 in suitable recesses provided interiorly of the cylinder one to each side of the slot 10 and pressed inwardly of the cylinder by means of springs 88.

It is thought that the construction, operation and advantages of the invention will now be quite apparent to those skilled in this art without a more detailed description thereof. The present embodiment of the invention has been disclosed merely by way of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an internal combustion engine, a stator member, a rotor member, one of said members being a circular cylinder having a continuous slot in its innermost portion, the other member being circular and including a pair of circumferentially spaced pistons having beveled ends and a pair of connecting sections between the pistons, one connecting section being longer and larger in section than the other sections, one piston being formed with a combustion chamber with intake and outlet ports at the ends thereof, valves for closing the ports, a track mounted on the cylinder, the major portion of the track being concentric with the cylinder and including a pair of rails terminating at one end of the track in opposite offset extension spaced from the other end of the track, rollers for riding on the opposite sides of the rails, means for mounting the rollers on the rails, means normally closing the valve over the exhaust port, means normally opening the valve from the intake port, said offset extensions actuating the valve through the rollers to overcome the means, a pair of abutments movable across the cylinder, and means normally urging the abutment inwardly against said member, said abutment being circumferentially spaced, one to each side of the offset extension, said cylinder being formed with circumferentially and radially spaced exhaust and intake openings, one to each side of one abutment, the intake opening being closed by said one section.

2. In an internal combustion engine, a stator member, a rotor member, one of said members being a circular cylinder, the other member being circular and including a pair of circumferentially spaced pistons having beveled ends and a pair of connecting sections between the pistons, one piston being formed with a combustion chamber with intake and outlet ports at the ends thereof, valve for closing the ports, means for operating the valves to open and close the ports, a pair of abutments movable across the cylinder, means normally urging the abutments inwardly against said other member, said abutments being circumferentially spaced one to each side of the offset extensions, said cylinder being formed with circumferentially and radially spaced exhaust and intake openings, one to each side of one abutment, one of said sections closing the intake opening as it passes thereby, and ignition means for firing gases in the combustion chamber.

3. In an internal combustion engine, a stator member, a rotor member, one of said members being a circular cylinder, the other member being circular and including a pair of circumferentially spaced pistons having beveled ends and a pair of connecting sections between the pistons, one connecting section being longer and larger in section than the other section, one piston being formed with a combustion chamber having intake and outlet ports at the ends of the pistons, valves for closing the ports, means for actuating the valves, a pair of abutments movable across the cylinder, means for normally urging the abutments inwardly against said other member, said abutments being circumferentially spaced, one to each side of the offset extension, said cylinder being formed with circumferentially and radially spaced exhaust and intake openings, one to each side of one abutment, intake openings being closed by said one section as it passes thereby, and ignition means for firing gases in the combustion chamber.

4. In an internal combustion engine, a stator member, a rotor member, one of said members being a circular cylinder, the other member being circular and including a pair of circumferentially spaced pistons having beveled ends and a pair of connecting sections between the pistons, one connecting section being longer and larger in section than the other section, one piston being formed with a combustion chamber having intake and outlet ports at the ends of the pistons, valves for closing the ports, means for actuating the valves, a pair of abutments movable across the cylinder, means for normally urging the abutments inwardly against said other member, said abutments being circumferentially spaced, one to each side of the offset extension, said cylinder being formed with circumferentially and radially spaced exhaust and intake openings, one to each side of one abutment, intake openings being closed by said one section as it passes thereby, and ignition means for firing gases in the combustion chamber, said other member being provided with a passage extending therethrough, spokes extending inwardly from said other member, a hub at the inner ends of the spokes, a shaft in the hub having passes extending longitudinally therewith and communicating with passages in one of the spokes, the passages in one of the spokes communicating with the passages of said other member, all of said passages being for the purpose of circulating water for cooling purposes.

In testimony whereof I affix my signature.

NIELS F. HANSON.